United States Patent [19]
Howell et al.

[11] Patent Number: 5,971,157
[45] Date of Patent: Oct. 26, 1999

[54] COMPACT DISC PACKAGE WITH PULL-OUT POCKET

[75] Inventors: George L. Howell, Elmira; Michael Paliotta, Horseheads, both of N.Y.

[73] Assignee: F.M. Howell & Company, Elmira, N.Y.

[21] Appl. No.: 09/172,674

[22] Filed: Oct. 15, 1998

[51] Int. Cl.⁶ .................................................. B65D 85/57
[52] U.S. Cl. .................................... 206/755; 206/308.1
[58] Field of Search .................... 206/232, 308.1, 206/312, 738, 752, 754, 755; 229/67.1, 92.8

[56] References Cited

U.S. PATENT DOCUMENTS

| | | | |
|---|---|---|---|
| 3,900,100 | 8/1975 | Girman | 206/755 |
| 4,896,766 | 1/1990 | Paley | 206/752 |
| 5,096,055 | 3/1992 | Opper | 206/754 |
| 5,317,823 | 6/1994 | Brunt, II | 206/308.1 |
| 5,421,452 | 6/1995 | Hybiske | 206/308.1 |
| 5,884,770 | 3/1999 | Galm | 206/232 |
| 5,887,714 | 3/1999 | Yeo | 206/308.1 |

*Primary Examiner*—Jim Foster
*Attorney, Agent, or Firm*—Arent Fox Kintner Plotkin & Kahn, PLLC

[57] ABSTRACT

The compact disc package of the present invention comprises a rectangular cardboard structure folded in a three-fold manner, once at its overall midpoint and at the midpoint of each part of the structure on either side of the overall midpoint. Each side is then folded inwards towards the overall midpoint forming a two-panel structure on both sides. The package further includes a tongue-like strip attached to a panel on one end and folded-over at its other end. The panel opposite that to which the tongue-like strip is attached is slit in a manner to enable passage of a compact disc into and out of the slit. The tongue-like strip carries the disc, on its folded-over end, into and out of the slit.

6 Claims, 2 Drawing Sheets

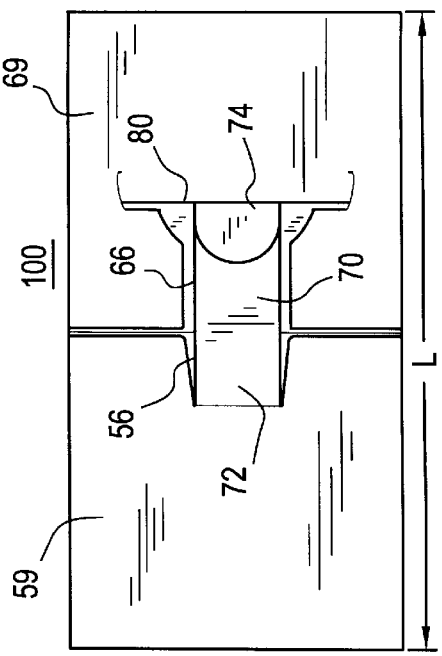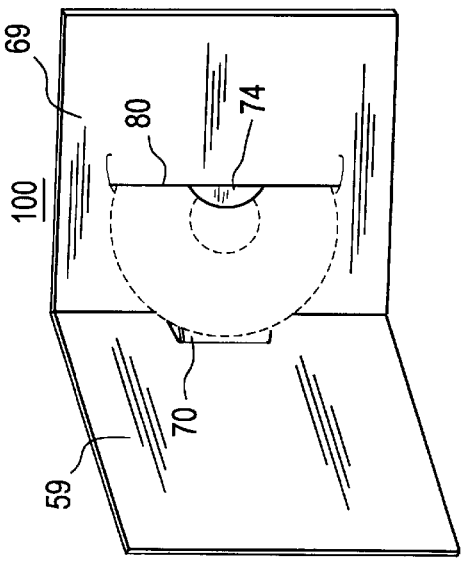

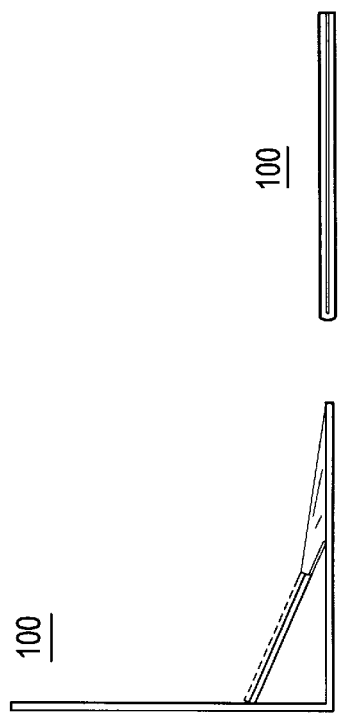
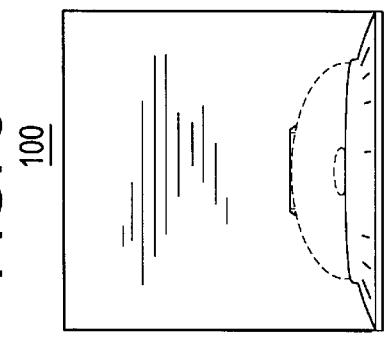
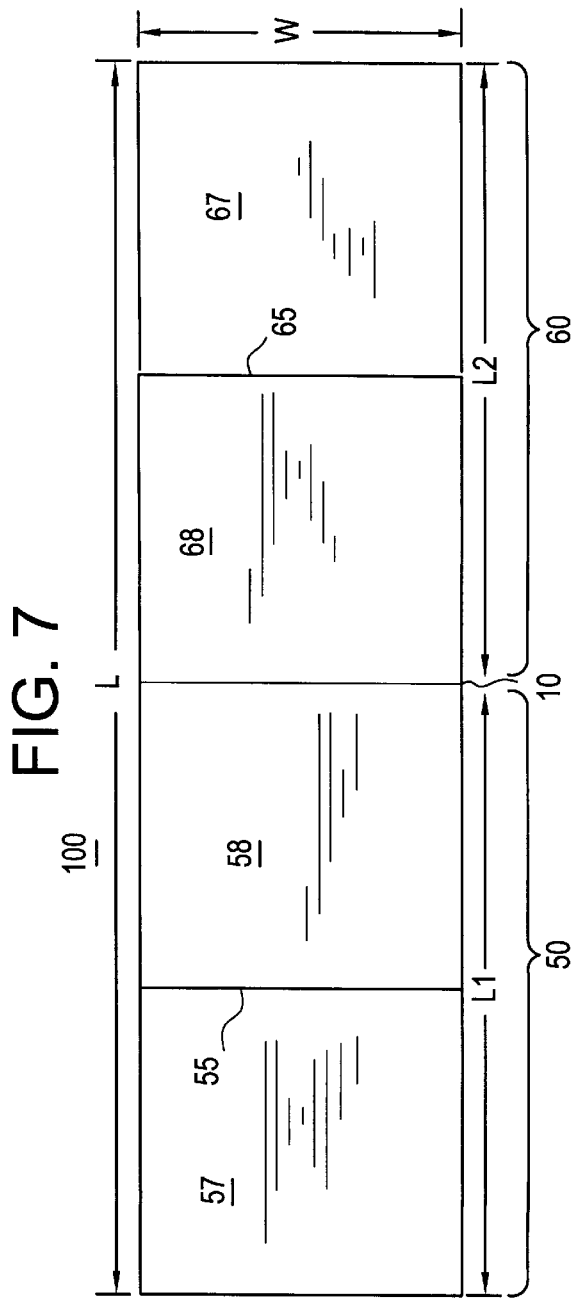

COMPACT DISC PACKAGE WITH PULL-OUT POCKET

BACKGROUND OF THE INVENTION

This invention relates to a compact disc package and, more particularly to a novel and effective package for storing a compact audio disc (CD) which is less costly and easier to manufacture than conventional CD packaging and which is easier for the user to open and remove the CD for playing.

This package overcomes many deficiencies inherent in existing CD packages. For example, a conventional CD package (known as a "jewel box") now on the market comprises three plastic pieces, namely a base plate, a disc support member and a cover rotatably engaged with the base plate. The manufacture of this package requires three molding dies and the package is therefore relatively costly to manufacture. Moreover, this conventional package is not opened easily by a single hand, nor is a disc easily withdrawn from the open package by a single hand. It is difficult, and even dangerous, for user driving a car, for example, to attempt to remove a disc which is stored in such a package while the car is in motion. However, more cars are being equipped with CD players, so there is a need for a more easily opened package.

Also, when a user attempts to remove a CD from a conventional jewel box package, because the CD is not easily removed, there is a risk that the user will leave scratches, finger marks or smudges on the surface of the CD which may detiorate the quality of music played because of problems the CD player's laser beam has reading the digitally-stored signals recorded on the disc when smudges are on that disc.

SUMMARY OF THE INVENTION

It is therefore an object of the present invention to provide a package for a compact disc which is inexpensive to manufacture in that it is not comprised of plastic and is easier to assemble than conventional plastic jewel box CD packaging.

It is an additional object of the present invention to provide a package for a CD that is easy for a user to open and remove the CD with one hand.

Another object of the present invention is to provide a package for a CD that avoids the danger of the user's scratching or smudging of the CD when attempting to remove it from its package.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

The achieve the objects and in accordance with the purposes of the invention, as embodied and broadly described herein, the compact disc package of this invention comprises a foldable rectangular structure having a width and a length and having a first fold made at a first midpoint of the length of the foldable rectangular structure thereby dividing the foldable rectangular structure into a first shorter rectangular structure having a width and a length and a second midpoint, and a second shorter rectangular structure having a width and a length and a third midpoint, the first shorter rectangular structure being folded in a manner such that a first flap of the first shorter rectangular structure is folded inwards along the second midpoint towards the fold at the midpoint of the foldable rectangular structure thereby forming a second fold, and a second flap of the second shorter rectangular structure is folded inwards along the third midpoint towards the fold at the first midpoint of the foldable rectangular structure thereby forming a third fold; a first portion of the foldable rectangular structure formed from the first flap and the first midpoint and forming a first side panel, and a second portion of the foldable rectangular structure formed from the second flap and the first midpoint and forming a second side panel, wherein the foldable rectangular structure opens in a. book-like manner; and a tongue-like strip having a length which extends to a fourth midpoint of the length of the second side panel, the tongue-like strip being integrally and foldably connected to and extending from the first flap at a first end, and being folded-over at a second end in a manner creating a tab-like holder, the tab-like holder being) used to hold a compact disc therein; the second flap being slit across the width, the tongue-like strip extending from the first end for a length extending into the second flap of the second side panel when the foldable rectangular structure is opened and extending into and through the slit; whereby when the foldable rectangular structure is opened in the book-like manner, the tongue-like strip carries the compact disc out of the space between the second flap and the second side panel through the slit and towards the first side panel.

The accompanying drawings, which are incorporated in and constitute part of this specification, illustrate one embodiment of the invention and, together with the description, serve to explain the principles of the invention.

BRIEF DESCRIPTION OF THE DRAWINGS

FIG. 1 is a frontal view of the disc package of the present invention when the package is in a partially-opened position showing the disc in the slit of the second side panel;

FIG. 2 is a frontal view of the disc package of FIG. 1 in a more opened position than that of FIG. 1;

FIG. 3 is a frontal view of the disc package of FIG. 1 in the fully-opened position showing the disc being pulled out of the pocket;

FIG. 4 is a frontal view of the disc package as it is being closed;

FIG. 5 is a top view of the disc package showing the disc being held within the package;

FIG. 6 is a side view of the disc package when the two sides of the package are perpendicular to each other;

FIG. 7 is a top view of the back of the disc package when the package is in the fully-opened position; and FIG. 8 is a side view of the disc package in the fully-closed position.

DESCRIPTION OF THE PREFERRED EMBODIMENT

Reference will now be made in detail to the present preferred embodiment of the invention, an example of which is illustrated in the accompanying drawings in which like reference characters refer to corresponding elements.

The present invention relates to a package for a compact disc which is made out of cut and folded cardboard. The compact disc package 100 is easily opened and retrieves the disc in a manner in which a user need only use a single hand to both open the package and retrieve the disc for insertion into a compact disc player. As shown in FIG. 7, the compact disc package 100 may be formed from a unitary blank of foldable cardboard material. The unitary blank is a rectangular structure having a length L which is longer than its width W. Initially, the rectangular structure 100 is folded three times. A first fold 10 is made at the midpoint of the length L thereby dividing the rectangular structure into a first shorter rectangular structure 50 and a second shorter rectangular structure 60. Both rectangular structures 50 and 60 have widths which are the same as the width W of the full rectangular structure 100. Rectangular structure 50 has a length L1 which is half of the length L and rectangular structure 60 has a length L2 which is half of the length L. The shorter rectangular structure 50 is then folded along its width at fold 55, the midpoint of L1, and the shorter rectangular structure 60 is folded along its width at fold 65, the midpoint of L2. A flap 57 of shorter rectangular structure 50 is folded inwards towards midpoint 10 along fold 55 and a flap 67 of shorter rectangular structure 60 is folded inwards towards midpoint 10 along fold 65. A first portion of the rectangular structure 100 comprised of first flap 57 folded over an underportion 58 forms a first panel 59 (not shown) and a second portion of the rectangular structure 100 comprised of second flap 67 folded over an underportion 68 forms a second panel 69 (not shown). First flap 57 may be adhered to underportion 58 by glue or other suitable adhesive material. In like manner, second flap 67 may be adhered to underportion 68. The resulting package then opens and closes along midpoint 10 in a book-like manner and has first panel 59 (comprised of first flap 57 and underportion 58) and second panel 69 (comprised of second flap 67 and underportion 68).

As shown in FIGS. 1–4, the compact disc package 100 of the present invention also includes a tongue-like strip 70 which is integrally and foldably connected to first flap 57 of first panel 59 at a first end 72. The tongue-like strip 70 has a second end 74 which is rounded and folded-over. Preferably, the length of the tongue-like strip 70 from first end 72 to second end 74 is 7¼ inches. The width of tongue-like strip 70 is 1½ inches (except that second end 74 is rounded and tapered). The length of the portion of second end 74 which is folded-over is 2 inches. First flap 57 and second flap 67 have cut out sections 56 and 66, respectively. Cut-out section 56 in first flap 57 is slightly wider than the width of tongue-like strip 70 and is 1½ inches long. Cut-out section 66 in second flap 67 is slightly wider than the width of tongue-like strip 70 at the end of second flap 67 which is closest to midpoint 10. This portion of cut-out section 66 is 1¾ inches in length. Cut-out section 66 is also rounded in a manner to enable the compact disc to slide in between flap 67 and underportion 68. At the end of cut-out section 66 furthest from midpoint 10, flap 67 is slit down its width at slit 80. The slit 80 in flap 67 is 4¾ inches wide and one-half inch deep. A compact disc may be housed in between flap 67 and underportion 68 of panel 69 of the package 100.

When the compact disc package 100 is opened in a book-like manner, the compact disc is withdrawn from between flap 67 and underportion 68 through the slit 80. The compact disc sits on and is held by the folded-over end 74 of tongue-like strip 70. Tongue-like strip 70 carries the compact disc out of the slit 80 with the book-like opening action. When the compact disc package 100 of the present invention is fully-opened, as shown in FIG. 3, approximately 1½ inches of end 74 of tongue-like strip 70 is outside of slit 80 and the compact disc is easily retrievable by a user using a single hand to retrieve it. When package 100 is closed, the compact disc is carried by tongue-like strip 70 through slit 80 and resides between flap 67 and underportion 68.

It will be apparent to those skilled in the art that various modifications and variations can be made in the compact disc package of the present invention without departing from the scope or spirit of the invention. Thus, it is intended that the present invention cover those modifications and variations provided they come within the scope of the appended claims and their equivalents.

What is claimed is:

1. A compact disc package comprising:
    a foldable rectangular structure having a width and a length and having
        a first fold made at a first midpoint of the length of the foldable rectangular structure thereby dividing the foldable rectangular structure into a first shorter rectangular structure having a width and a length and a second midpoint, and a second shorter rectangular structure having a width and a length and a third midpoint, said first shorter rectangular structure being folded in a manner such that a first flap of said first shorter rectangular structure is folded inwards along the second midpoint towards the fold at the first midpoint of the foldable rectangular structure thereby forming a second fold, and a second flap of said second shorter rectangular structure is folded inwards along the third midpoint towards the fold at the first midpoint of the foldable rectangular structure thereby forming a third fold, a first portion of the foldable rectangular structure formed from said first flap and the first midpoint and forming a first side panel, and a second portion of the foldable rectangular structure formed from said second flap and said first midpoint and forming a second side panel, wherein the foldable rectangular structure opens in a book-like manner; and
    a tongue-like strip having a length which extends to a fourth midpoint of the length of said second side panel, said tongue-like strip being integrally and foldably connected to and extending from the first flap at a first end, and being folded-over at a second end in a manner creating a tab-like holder, said tab-like holder being used to hold a compact disc therein, said second flap being slit across the width, said tongue-like strip extending from the first end for a length extending into said second flap of said second side panel when the foldable rectangular structure is opened and extending into and through said slit, whereby when said foldable rectangular structure is opened in said book-like manner, said tongue-like strip carries the compact disc out of the space between the second flap and the second side panel through the slit and towards the first side panel.

2. The compact disc package of claim 1 wherein the compact disc package is comprised of cardboard.

3. The compact disc package of claim 1 wherein the length of each of the first and second side panels is approximately 6½ inches and the width of each of the first and second side panels is approximately 6¾ inches.

4. The compact disc package of claim 1 wherein the length of the tongue-like strip is approximately 7¼ inches total, the length of the folded-over portion of the tongue-like strip is approximately 2¼ inches of the 7¼ inches total length of the cardboard strip and the width of the tongue-like strip is approximately 1¾ inches.

5. The compact disc package of claim 1 wherein the second end of the tongue-like strip is rounded and tapered.

6. The compact disc package of claim 1 wherein the first flap of the first side panel is glued to the panel underneath and the second flap of the second side panel is glued to the panel underneath.

* * * * *